United States Patent

Ovshinsky et al.

[11] Patent Number: 5,591,501
[45] Date of Patent: Jan. 7, 1997

[54] OPTICAL RECORDING MEDIUM HAVING A PLURALITY OF DISCRETE PHASE CHANGE DATA RECORDING POINTS

[75] Inventors: Stanford R. Ovshinsky, Bloomfield Hills, Mich.; Hellmut Fritzsche, Chicago, Ill.

[73] Assignee: Energy Conversion Devices, Inc., Troy, Mich.

[21] Appl. No.: 575,273

[22] Filed: Dec. 20, 1995

[51] Int. Cl.⁶ .......................................... B32B 3/00
[52] U.S. Cl. ............. 428/64.1; 428/64.2; 428/64.4; 428/64.5; 428/64.7; 428/913; 430/270.1; 430/270.11; 430/270.12; 430/270.15; 430/945; 369/275.1; 369/275.2; 369/275.4; 369/283; 369/288
[58] Field of Search ................ 428/64.1, 64.2, 428/64.4, 64.5, 64.7, 913; 430/270.1, 270.11, 270.12, 270.13, 495, 945; 369/275.1, 275.2, 275.4, 283, 288

[56] References Cited

U.S. PATENT DOCUMENTS 5,063,097  11/1991  Hirota et al. ........................ 428/64
5,401,549   3/1995  Watase ................................ 428/64
5,418,030   5/1995  Tominaga et al. ................... 428/64

*Primary Examiner*—Patrick Ryan
*Assistant Examiner*—Elizabeth Evans
*Attorney, Agent, or Firm*—David W. Schumaker; Marvin S. Siskind; Marc J. Luddy

[57] ABSTRACT

A phase change optical recording medium which includes 1) a substrate having a planar surface; and 2) a plurality of discrete data recording points deposited upon the substrate. The discrete data recording points are formed from a phase change material which changes from a state of a first relative order to a state of a second relative order and visa versa upon the application of optical beam energy. Preferably the phase change material forming the plurality of discrete data recording points is deposited within individual cavities embossed into the surface of the substrate. More preferably the individual cavities are cylindrical or parabolic (bowl shaped) cavities having their central axis perpendicular to the plane of the surface of the substrate.

27 Claims, 1 Drawing Sheet

OPTICAL RECORDING MEDIUM HAVING A PLURALITY OF DISCRETE PHASE CHANGE DATA RECORDING POINTS

FIELD OF THE INVENTION

The instant invention relates generally to optical recording medium and more specifically to phase change optical recording medium. The instant phase change optical recording medium includes discrete data recording points deposited onto a substrate. Preferably the data recording points are disposed within individual cavities formed into the substrate.

BACKGROUND OF THE INVENTION

Nonablative state changeable data storage systems, for example, optical data storage systems, record information in a state changeable material that is switchable between at least two detectable states by the application of energy such as, for example, projected optical beam energy, electrical energy, or thermal energy, thereto.

State changeable data storage material is typically incorporated in a data storage device having a structure such that the data storage material is supported by a substrate and protected by encapsulants. In the case of optical data storage devices, the encapsulants include, for example, anti-ablation materials and layers, thermal insulation materials and layers, anti-reflection materials and layers, reflective layers, and chemical isolation layers. Moreover, various layers may perform more than one of these functions. For example, anti-reflection layers may also be anti-ablation layers and thermal insulating layers. The thicknesses of the layers, including the layer of state changeable data storage material, are engineered to minimize the energy necessary for effecting the state change and to optimize the high contrast ratio, high carrier to noise to ratio, and high stability of state changeable data storage materials.

The state changeable material is a material capable of being switched from one detectable state to another detectable state or states by the application of, for example, projected beam energy, electrical energy, or thermal energy thereto. The detectable states of state changeable materials may differ in their morphology, surface topography, relative degree of order, relative degree of disorder, electrical properties, optical properties, including indices of refraction and reflectivity, or combinations of one or more of the foregoing. The state of the state changeable material is detectable by properties such as, for example, the electrical conductivity, electrical resistivity, optical transmissivity, optical absorption, optical refraction, optical reflectivity, or combinations thereof. That is, the magnitude of the detectable property will vary in a predictable manner as the state changeable material changes state.

Formation of the data storage device includes deposition of the individual layers by, for example, evaporative deposition, chemical vapor deposition, and/or plasma deposition. As used herein plasma deposition includes sputtering, glow discharge, and plasma assisted chemical vapor deposition.

Tellurium based materials have been utilized as state changeable materials for data storage where the state change is a structural change evidenced by a change in a physical property such as reflectivity. This effect is described, for example, in J. Feinleib, J. deNeufville, S. C. Moss, and S. R. Ovshinsky, "Rapid Reversible Light-Induced Crystallization of Amorphous Semiconductors," Appl. Phys. Lett., Vol. 18(6), pages 254–257 (Mar. 15, 1971), and in U.S. Pat. No. 3,530,441 to S. R. Ovshinsky for Method and Apparatus For Storing And Retrieving Of Information.

Tellurium based state changeable materials, in general, are single or multi-phased systems and: (1) the ordering phenomena include a nucleation and growth process (including both or either homogeneous and heterogeneous nucleations) to convert a system of disordered materials to a system of ordered and disordered materials; and (2) the vitrification phenomena include melting and rapid quenching of the phase changeable material to transform a system of disordered and ordered materials to a system of largely disordered materials. The above phase changes and separations occur over relatively small distances.

In typical use, optical recording media have certain criterion which if improved will give better, faster or more reliable data storage. Some of these criterion are: 1) data storage density; 2) data erasability; 3) data storage location accuracy (jitter); 4) memory medium sensitivity; and 5) carrier to noise ratio. These criterion will now be discussed.

Data storage density refers to the amount of data that can be stored per unit area. With present PCE optical disk construction and usage, the data is stored as amorphous spots in a film of crystalline phase change material. These spots are typically about 0.6 microns wide and 1.2 microns long (along the length of the data track). These spot sizes and the data encoding algorithm used to arrange the spots along the track for optimal density and disk/drive interaction limit the upper end density of data that can be stored per unit area of the optical recording medium. Therefore, if the spot sizes and/or the spaces in between can be reduced, data density can be increased.

Data erasability refers to the ability to totally erase a spot on the memory medium layer. As mentioned above, the data is stored as amorphous spots on a crystalline film. When the spots are erased, the material in the previously amorphous spot is recrystallized. However, the material is not in the same crystalline state as the virgin crystalline material. The virgin crystalline material (which fills areas between and surrounding the data storage spots) is composed of relatively small, randomly oriented crystallites, while the recrystallized spots are composed of relatively larger crystallites which are generally oriented toward the center of the spot. Because of the differences in crystallite size and orientation, there is a difference in the reflectivity of the virgin crystalline material and the recrystallized spots. This reflectivity difference makes it more difficult to determine whether the spot has been erased or not, because it imparts residual read signal levels which appear as data signals. Therefore, if the reflectivity of the reflective material between and surrounding the data storage spots can be more closely matched to the reflectivity of the data storage material (in either its amorphous or recrystallized form) then the erasability (i.e. the detection of which state a particular spot is in) can be improved.

Data jitter relates to the minute fluctuations in the timing of the rise and fall of the electric signal generated by reflecting the read laser beam off the recorded media, as it moves under the laser beam, to an opto-electronic detector. In a typical optical recording medium, statistical variation causes the location of a data spot to fluctuate within a known range (i.e. the location of the spot jitters). Because of this statistical variation of the exact location of the data storage spots, reading the state of any recorded data spots becomes less precise. Therefore, an increased accuracy of data storage location (i.e. reduction in jitter) will make reading the disk more reliable.

Sensitivity relates to the amount of power required to transform the phase change medium from one state to the other. This in turn relates to the total volume of material required to be transformed. Therefore, smaller data recording spot sizes (i.e. smaller total volume required to be transformed) requires less laser power and increases the sensitivity.

Finally, carrier-to-noise ratio again is based on the difference in reflectivity between amorphous and crystalline material, and any other fluctuations in reflectivity. The different reflectivities of the virgin crystalline and recrystallized material increases, making determination of the stored data patern less reliable. By matching the surrounding reflectivity to that of one state of the data storage spots, the noise level contributed by the different crystalline structures is greatly reduced or even eliminated.

The data storage medium of the instant invention can improve any combination of these criterion.

SUMMARY OF THE INVENTION

The instant invention comprises a phase change optical recording medium which includes 1) a substrate having a planar surface; and 2) a plurality of discrete data recording points formed upon the substrate. The discrete data recording points are formed from a phase change material which changes from a state of a first relative order to a state of a second relative order and visa versa upon the application of optical beam energy. Preferably the phase change material forming the plurality of discrete data recording points is deposited within individual cavities embossed into the surface of the substrate. More preferably the individual cavities are cylindrical cavities having their central axis perpendicular to the plane of the surface of the substrate.

The phase change material preferably includes at least one chalcogen element, such as Te, Se or mixtures or alloys thereof and also may include Ge, Sb and mixtures or alloys thereof. Additionally the phase change material may further include one or more elements selected from Pt, Pd, Cr, Fe, Ni, Bi, Pb, Sn, As, S, Si, P, O and mixtures or alloys thereof.

BRIEF DESCRIPTION OF THE DRAWINGS

FIG. 2a depicts cylindrical cavities.

DETAILED DESCRIPTION OF THE INVENTION

Figure 1:
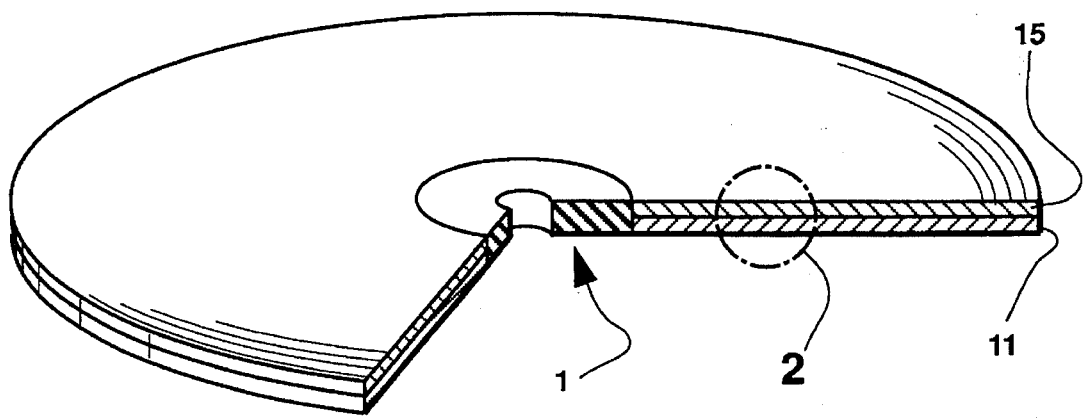
FIG. 1 is a partial cut-away isometric view, not to scale, with exaggerated latitudinal dimensions and vertical scale, of an optical data storage device constructed in accord with the teachings of the present invention.

Throughout the following detailed description, like reference numerals are used to refer to the same element shown in multiple figures thereof.

Figure 2A:
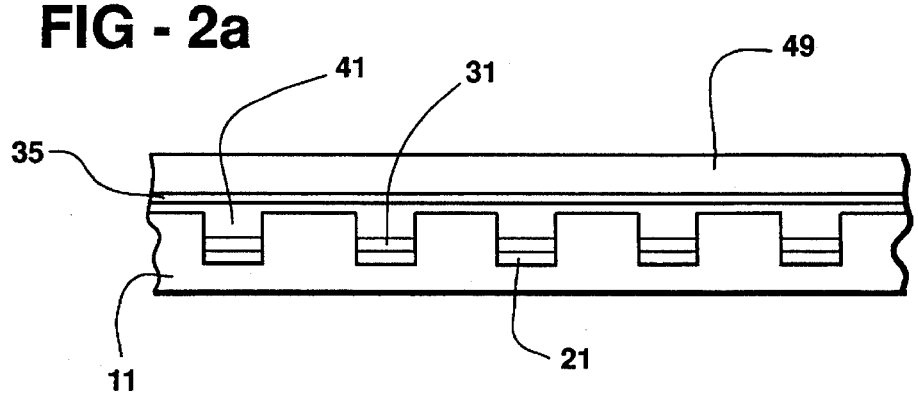
FIG. 2a is a detailed section of a part of the optical data storage device of FIG. 1 showing the relationship of the various layers thereof and particularly showing how the phase change material for the discrete data storage points is preferably deposited into individual embossed cavities on the surface of the substrate.
Figure 2B:
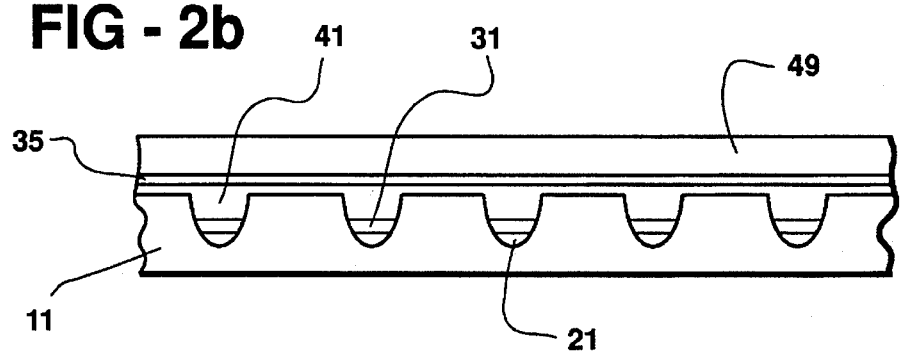
FIG. 2b is identical to FIG. 2a except that cavities into which the phase change material for the discrete data storage points are parabolic or bowl shaped cavities.

FIGS. 1, 2a and 2b show a projected beam data storage device 1 having a substrate, for example a plastic substrate 11, a first encapsulating dielectric layer 21, a plurality of discrete phase change data storage points 31, a second dielectric layer 41, a reflective layer 35, and a protective coating 49. Layer 49 may alternatively be an adhesive layer and a second optical recording medium 51 may be adhered thereto, thereby forming a dual sided recording medium.

FIGS. 2a and 2b show a section of preferred embodiments of the data storage device of FIG. 1 in greater detail particularly showing how the phase change material forming the discrete data storage points is preferably deposited into individual embossed or otherwised formed cavities on the surface of the substrate 11. In FIG. 2a, the embossed cavities are cylindrical with their central axis perpendicular to the surface of the substrate. In FIG. 2b, the embossed cavities are parabolic or bowl shaped with their central axis perpendicular to the surface of the substrate. The cavities are aligned in linear or curvilinear tracks on the substrate and the data storage sites may be tracked by the use of a technique known in the art as "sampled servo tracking".

Preferably the cavities are between up to about 0.6 in diameter (at the surface of the substrate) and are preferably spaced about one diameter apart. The cavities into which the phase change material (which comprises the discrete data recording points) is deposited are polymerized, molded, injection molded, cast or embossed into the polymeric substrate 11. Because the data storage points are of fixed size and fixed placement on the medium, an increase in density, erasability and sensitivity, and a decrease in jitter are possible.

Preferably the substrate 11 is a polymeric sheet, for example a polycarbonate sheet. The substrate 11 is a substantially optically invariant, optically isotropic, transparent sheet. The preferred thickness is about 0.6 mm.

The protective layer 49 may consist of a spin coated, photoinitiated, polymerized acrylic sheet, which may be up to about 0.01 mm or more in thickness. Alternatively, the protective layer 49 may be adhered to the reflective layer 35 by a layer of adherent material (not shown). Layer 49 may also be a layer of adherent material and a second optical recording medium 51 may be adhered to layer 49, thereby forming a dual sided optical recording medium.

Deposited within the cavities adjacent to the substrate 11 is a dielectric barrier layer 21. A similar dielectric encapsulating layer 41 lies between the phase change memory material layers 31 (deposited within the cavities atop the first dielectric layer 21) and reflective layer 35. The dielectric barrier layers 21, 41, for example, of a mixture of silicon dioxide and zinc sulfide, are each from about 500 to about 2000 Angstroms thick. The dielectric barrier layers 21, 41 have one or more functions. They can serve to optimize reflectivity and/or chemically protect the phase change layer 31 and/or prevent the plastic substrates from deforming due to local heating of the phase change layer 31, e.g., during recording or erasing.

Other dielectrics may provide the encapsulating layers 21, 41. For example, the encapsulating layers may be germanium oxide, silica, alumina, silicon nitride, or other dielectric. The composition of any 0f these materials may be layered or graded to avoid diffusion into the phase change layer 31.

The chalcogenide compound data storage medium layer 31 is comprised of a congruent state changeable material which is capable of existing in at least an amorphous state and a crystalline state. The material has a first detectable characteristic, such as optical reflectivity, when in the crystalline state, and a second detectable characteristic, again such as optical reflectivity, when in the amorphous state. In one adaptation, the chalcogenide memory layer 31 is used as an anti-reflection coating for the reflective layer 35. The optical constants of the two layers are such that the thickness of the chalcogenide layer is chosen to be very thin (about 300 angstroms) to achieve maximum reflectivity contrast and sensitivity. Because the chalcogenide layer 31 is only partially transmissive, the contribution of the reflective layer 35 to the total reflectivity increases when the chalcogenide layer 31 is thinner, which improves the contrast. The thickness of the reflective layer 35 is not as important and one typical thickness is at least about 300 angstroms. It is important that the reflectivity of the combination of the reflective layer 35 and the dielectric layer 41 be matched to the reflectivity of one of the phases of the phase change material. This allows for increased erasability.

In general, it has been found that optimum phase change material performance in terms of switching speed is achieved when tellurium comprises approximately 50 atomic percent of the material and germanium together with either antimony, bismuth or tin comprises the remainder. The generic formula for this improved material may be written $Te_{50}(GeX)_{50}$ where X equals Sb, Bi or Sn, it being understood that several percent deviation from the general formula may be tolerated without significant effect.

The Te—Ge system forms a rhombohedral crystalline phase and it is speculated that when the (GeX) component is in an approximate 1:1 ratio with the Te, the crystal structure becomes face centered cubic and reversible, high speed switching is achieved.

In general, some germanium must be present to assure that the desired TeGe phase is developed; however, it has been found that Sb, Sn, Bi and the like may substitute for a significant portion of the Ge while preserving the desired morphology.

The material of chalcogenide layer 31 is capable of undergoing a congruent state change upon the application of projected beam energy such as laser energy thereto. The material is a compound having the composition $Te_aGe_bSb_c$ where a, b and c are expressed in atomic percentages and selected such that, when the material is in the crystalline state, the material is substantially crystalline and includes a major crystal phase which has the same composition as the material has when in the amorphous state. The crystalline material may further include a minor portion which has the composition $Te_dGe_e Sb_f$ where d, e and f are expressed in atomic percentages.

After experimenting with a range of optical recording film compositions, it has been experimentally determined that, where a is from 44 to 53 atomic percent, b is from 18 to 30 atomic percent and c is from 18 to 30 atomic percent, the compositions exhibit optimum performance when tested for sensitivity, and crystallization temperature, $T_x$. It is also believed that compositional congruency is maintained when, for example, the following limitations are observed:

| Te 47–53 | Ge 35–45 | Sb 6–13 | or |
| Te 50–59 | Ge 23–29 | Sb 15–21 | or |
| Te 47–53 | Ge 15–21 | Sb 23–29 | or |
| Te 55–61 | Ge 11–17 | Sb 25–31 | |

On the basis of the experimental data, it is estimated that the data storage lifetime, as limited by thermal stability, exceeds several decades at 50° C.

It is believed that there are other distinct compositions within the TAG ternary system that form crystals including all three elements and having a composition similar to the composition of the bulk material. For example, the following compositions will consistently crystallize from materials having elemental ratios of Te:Ge:Sb in this vicinity:

| Te 51 | Ge 40 | Sb 9 |
| Te 4  | Ge 1  | Sb 2 |
| Te 7  | Ge 1  | Sb 4 |

Again, it is expected that materials of this composition will exhibit superior performance characteristics. It is, of course, possible that other ratios of the elements within the TAG ternary system may be useful in the optical recording medium of the instant invention. Additionally chalcogenide systems containing at least one chalcogenide selected from Te or Se in general will be useful. These phase change materials may additionally contain elements the group Ge, Sb and mixtures or alloys thereof. They may also further include one or more elements selected from the group of Pt, Pd, Cr, Fe, Ni, Bi, Pb, Sn, As, S, Si, P, O and mixtures or alloys thereof.

Production of the optical memory medium of the instant invention is not greatly different than that of prior art. Specifically, the first dielectric layer, the phase change layer and the second dielectric layer are deposited onto the substrate into which the data storage cavities of the present invention are embossed or molded. The deposition of these layer can be by any known prior art techniques such as sputtering, evaporation, glow discharge, microwave CVD, etc.

Once one or more of the layers have been deposited, the disk can be subjected to chemical mechanical polishing or other planarizing techniques to remove unwanted materials from between the cavities (e.g., portions of the second dielectric and chalcogenide layers) thereby leaving a planar surface of dielectric material onto which subsequent layers (e.g. the reflective layer) and the protective coating may be deposited. The protective coating may be a Spun-on uv cured polymer type material or may be a layer of polymeric material attached by adhesive.

While the invention has been described with reference to a particular exemplifications and embodiments thereof, it is not intended to be limited to the exemplification and embodiments described. Rather, it is the claims appended hereto and all reasonable equivalents thereof which define the true scope of the present invention.

We claim:

1. A phase change optical recording medium including:

a substrate having a planar surface;

a plurality of discrete data recording points deposited upon said substrate, said discrete data recording points being formed from a phase change material which changes from a state of a first relative order to a state of a second relative order and visa versa upon the application of optical beam energy.

2. The phase change optical recording medium of claim 1, wherein said phase change material forming said plurality of discrete data recording points is deposited within individual cavities formed on the surface of said substrate.

3. The phase change optical recording medium of claim 2, wherein said individual cavities formed in said substrate are cylindrical cavities having their central axis perpendicular to the plane of said surface of said substrate.

4. The phase change optical recording medium of claim 2, wherein said individual cavities formed in said substrate are parabolic cavities having their central axis perpendicular to the plane of said surface of said substrate.

5. The phase change optical recording medium of claim 2, wherein said individual cavities are embossed into said surface of said substrate.

6. The phase change optical recording medium of claim 1, wherein said phase change material includes at least one chalcogen element.

7. The phase change optical recording medium of claim 6, wherein said at least one chalcogen element is selected from the group consisting of Te, Se or mixtures or alloys thereof.

8. The phase change optical recording medium of claim 7, wherein said phase change material additionally includes elements the group consisting of Ge, Sb and mixtures or alloys thereof.

9. The phase change optical recording medium of claim 8, wherein said phase change material further includes one or more elements selected from the group consisting of Pt, Pd, Cr, Fe, Ni, Bi, Pb, Sn, As, S, Si, P, O and mixtures or alloys thereof.

10. The phase change optical recording medium of claim 8, wherein said phase change material includes Te, Ge and Sb.

11. The phase change optical recording medium of claim 1, wherein said phase change material is characterized in that the first state comprises a single phase and said second state comprises either (1) a single phase having the same composition as said first state or (2) a plurality of phases which have substantially similar crystallization temperatures and kinetics.

12. The phase change optical recording medium of claim 1, wherein said phase change material being of the composition:

$$Te_a Ge_b Sb_c$$

a, b and c being expressed in atomic percentages and selected such that, when said material is in the crystalline state, and it includes a major portion which has the same composition as the material has when in the amorphous state.

13. The phase change optical recording medium of claim 12, wherein a is from 44 to 53, b is from 18 to 30 and c is from 18 to 30.

14. The phase change optical recording medium of claim 13, wherein said phase change material further comprises a third portion of varying composition.

15. The phase change optical recording medium of claim 1, wherein said plurality of discrete data recording points deposited upon said substrate are arranged in linear or curvilinear tracks on said substrate.

16. The phase change optical recording medium of claim 1, further including a dielectric material deposited between said substrate and each of said a plurality of discrete data recording points.

17. The phase change optical recording medium of claim 16, wherein said dielectric material comprises a silicon dioxide/zinc sulfide material.

18. The phase change optical recording medium of claim 16, further including a dielectric material deposited atop said substrate and each of said a plurality of discrete data recording points.

19. The phase change optical recording medium of claim 18, wherein said dielectric material comprises a silicon dioxide/zinc sulfide material.

20. The phase change optical recording medium of claim 18, further including a reflective layer deposited over said dielectric layer.

21. The phase change optical recording medium of claim 20, wherein said reflective layer is formed from a reflective metal.

22. The phase change optical recording medium of claim 21, wherein the reflectivity of the regions of the disk surface between the discrete data recording points substantially matches the reflectively of said phase change material within the discrete recording points in either its state of a first relative order or its state of a second relative order.

23. The phase change optical recording medium of claim 21, wherein said reflective metal is aluminum or an aluminum alloy.

24. The phase change optical recording medium of claim 20, further including a protective polymeric coating deposited atop said reflective layer.

25. The phase change optical recording medium of claim 20, further including an adhesive coating deposited atop said reflective layer upon which a second optical disk is adhered, thereby forming a two sided optical disk.

26. The phase change optical recording medium of claim 1, wherein said substrate is formed from a polymeric material.

27. The phase change optical recording medium of claim 26, wherein said substrate is formed from polycarbonate.

* * * * *